US009571381B2

(12) United States Patent
Jain et al.

(10) Patent No.: US 9,571,381 B2
(45) Date of Patent: Feb. 14, 2017

(54) SYSTEM AND METHOD FOR INTER-DOMAIN RSVP-TE LSP LOAD BALANCING

(71) Applicants: Pradeep G Jain, Mountain View, CA (US); Kanwar D Singh, Mountain View, CA (US); Jaishal Shah, Mountain View, CA (US); Srikrishnan Venkataraman, Mountain View, CA (US)

(72) Inventors: Pradeep G Jain, Mountain View, CA (US); Kanwar D Singh, Mountain View, CA (US); Jaishal Shah, Mountain View, CA (US); Srikrishnan Venkataraman, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 309 days.

(21) Appl. No.: 13/837,531

(22) Filed: Mar. 15, 2013

(65) Prior Publication Data

US 2013/0322253 A1    Dec. 5, 2013

Related U.S. Application Data

(60) Provisional application No. 61/653,219, filed on May 30, 2012.

(51) Int. Cl.
| | | |
|---|---|---|
| *H04L 12/26* | (2006.01) | |
| *H04L 12/761* | (2013.01) | |
| *H04L 12/803* | (2013.01) | |
| *H04L 12/723* | (2013.01) | |
| *H04L 12/729* | (2013.01) | |
| *H04L 12/801* | (2013.01) | |
| *H04L 12/913* | (2013.01) | |

(Continued)

(52) U.S. Cl.
CPC ............... *H04L 45/16* (2013.01); *H04L 43/16* (2013.01); *H04L 45/04* (2013.01); *H04L 45/124* (2013.01); *H04L 45/125* (2013.01); *H04L 45/50* (2013.01); *H04L 47/125* (2013.01); *H04L 47/35* (2013.01); *H04L 47/724* (2013.01)

(58) Field of Classification Search
CPC .......... H04L 41/12; H04L 45/02; H04L 45/48; H04L 45/50; H04L 47/125
USPC .......................... 370/235, 236, 254, 255, 256
See application file for complete search history.

(56) References Cited

U.S. PATENT DOCUMENTS

2006/0182035 A1    8/2006    Vasseur
2006/0198308 A1    9/2006    Vasseur et al.
(Continued)

OTHER PUBLICATIONS

The International Search Report and the Written Opinion of the International Searching Authority, or the Declaration, in PCT/US2013/042831, mailed Sep. 3, 2013, Alcatel-Lucent USA Inc., Applicant, 13 pages.

(Continued)

*Primary Examiner* — Ricky Ngo
*Assistant Examiner* — Wei-Po Kao
(74) *Attorney, Agent, or Firm* — Tong, Rea, Bentley & Kim, LLC

(57) ABSTRACT

A system, method and apparatus for causing network routers such as Area Border Routers (ABRs) to use a preferred tie-breaking mechanism to select one path in the event of an ERO expansion operation resulting in multiple equal cost paths.

20 Claims, 3 Drawing Sheets

(51) Int. Cl.
*H04L 12/715* (2013.01)
*H04L 12/721* (2013.01)

(56) References Cited

U.S. PATENT DOCUMENTS

| | | |
|---|---|---|
| 2008/0084890 A1* | 4/2008 | Kompella .................... 370/400 |
| 2008/0123533 A1* | 5/2008 | Vasseur .................. H04L 45/00 |
| | | 370/238 |
| 2009/0238074 A1 | 9/2009 | Vasseur et al. |
| 2010/0272110 A1* | 10/2010 | Allan et al. .............. 370/395.53 |
| 2011/0280123 A1 | 11/2011 | Wijnands et al. |
| 2012/0099422 A1 | 4/2012 | Liu et al. |
| 2012/0218898 A1* | 8/2012 | Cai .................... H04L 12/1886 |
| | | 370/237 |
| 2013/0107699 A1 | 5/2013 | Miclea |
| 2014/0269296 A1* | 9/2014 | Khaddam .................... 370/235 |

OTHER PUBLICATIONS

Le Roux (Editor) France Telecom J P Vasseur (Editor) Cisco System Inc Yuichi Ikejiri NTT Communications Raymond Zhang BT Infonet J: "IG protocol extensions for Path Computation Element (PCE) Discovery; draft-ietf-pce-disco-proto-igp-02.txt", Jun. 1, 2006, vol. pce, No. 2, Jun. 1, 2006 (Jun. 1, 2006), XP015045054, ISSN: 0000-0004, p. 2; pp. 4-7; p. 12; pp. 17-20; pp. 29-32.
Ikejiri et al., "IGP protocol extensions for Path Computation Element (PCE) Discovery," Jun. 2006, pp. 1-37.
Manayya, K.B., "Constrained Shortest Path First", IETF Networking Group, Feb. 20, 2009, 8 pages.

* cited by examiner

SYSTEM AND METHOD FOR INTER-DOMAIN RSVP-TE LSP LOAD BALANCING

CROSS-REFERENCE TO RELATED APPLICATION

This application claims the benefit of U.S. Provisional Patent Application Ser. No. 61/653,219, filed May 30, 2012, entitled TE-LSP SYSTEMS AND METHODS which application is incorporated herein by reference in its entirety.

FIELD OF THE INVENTION

The invention relates to the field of communication networks such as multi-protocol label switching (MPLS) networks and, more particularly but not exclusively, to a mechanism for load balancing for Label Switched Paths (LSP) spanning multiple areas.

BACKGROUND

Multiprotocol Label Switching (MPLS) enables efficient delivery of a wide variety of differentiated, end-to-end services. Multiprotocol Label Switching (MPLS) traffic engineering (TE) provides a mechanism for selecting efficient paths across an MPLS network based on bandwidth considerations and administrative rules. Each label switching router maintains a TE link state database with a current network topology. Once a path is computed, TE is used to maintain a forwarding state along that path.

As described in more detail in various Internet Engineering Task Force (IETF) Requests for Comment (RFC), such as RFC4726 and RFC5151, an Area Border Router (ABR) is a router located between several areas in a hierarchical Open Shortest Path First (OSPF) network. ABRs maintain topology information from multiple areas. In the case of Resource Reservation Protocol (RSVP) Inter-Domain TE-LSPs of type Contiguous LSP each Area Border Router (ABR) triggers a path computation (also referred to as an Explicit Route Object (ERO) expansion), before forwarding the RSVP Path message downstream. Thus, each ABR is responsible for calculating a TE-constrained path for its successive TE-Domain(s) or Area(s). Moreover, each ABR path computation may result in an equal cost multiple paths (ECMP) result where a tie-breaking procedure must be used to select one of the paths. For various reasons, it is preferable to ensure that the same tie-breaking procedure is used by each ABR along the LSP.

SUMMARY

Various deficiencies in the prior art are addressed by systems, methods and apparatus adapting the operation of Area Border Routers (ABRs) in a network such that all ABRs use a preferred tie-breaking mechanism to select one path in the event of an ERO expansion operation resulting in multiple equal cost paths.

A method according to one embodiment comprises receiving a RSVP path message including an indication of a preferred tie-breaking mechanism; if an ERO expansion operation to reach a next LSP hop results in multiple equal cost paths, selecting one of the paths according to the preferred tie-breaking mechanism; and forwarding the RSVP path message including the indication of a preferred tie-breaking mechanism toward a next hop.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various embodiments will be described within the context of a network supporting Resource Reservation Protocol (RSVP) Inter-Domain Traffic Engineering Label Switched Paths (TE-LSPs) of type Contiguous LSP, such as defined in IETF RFC4726 and RFC5151, each of which is incorporated by reference in its respective entirety.

Figure 1:
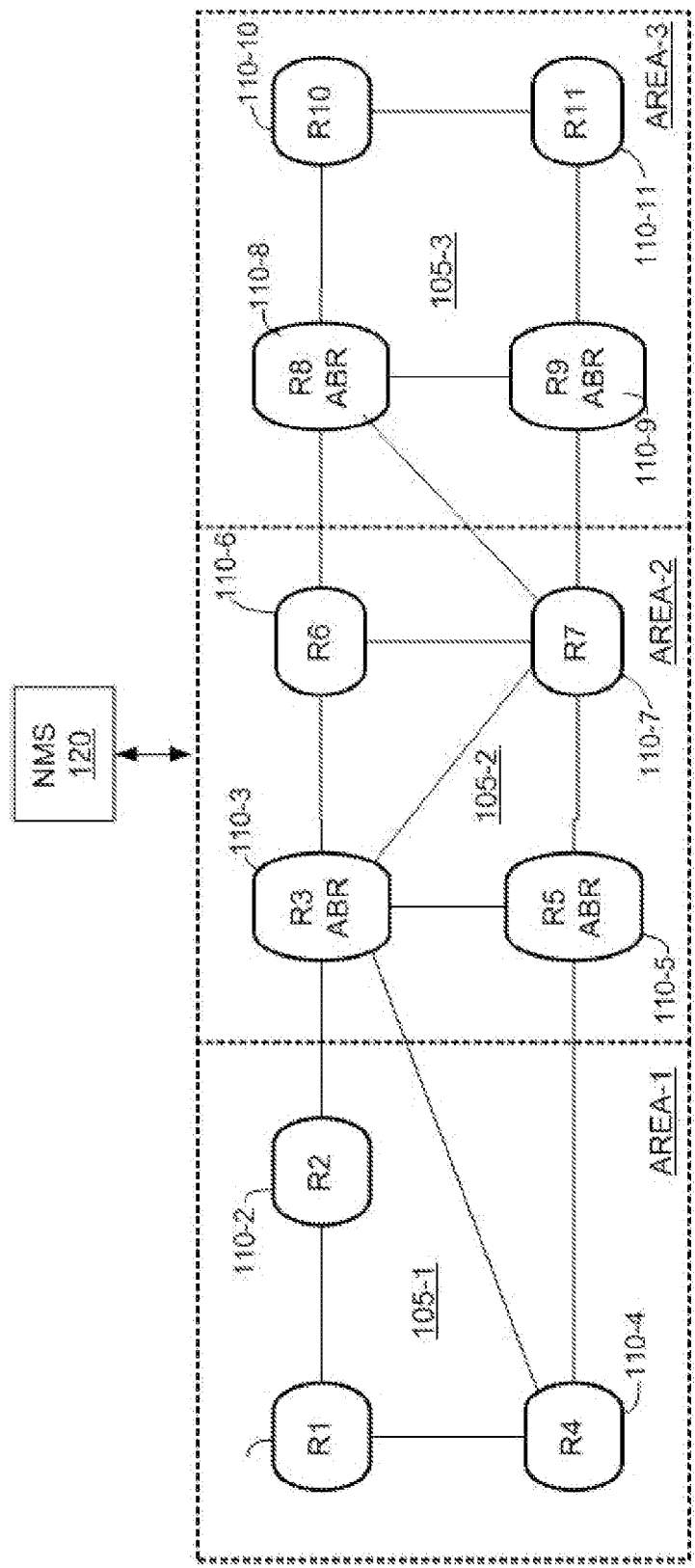
FIG. 1 depicts an exemplary network benefiting from the various embodiments.

FIG. 1 depicts a high-level block diagram of a communication network benefiting from various embodiments. Specifically, the network 100 of FIG. 1 provides a Multi-Protocol Label Switching (MPLS) network supporting Resource Reservation Protocol (RSVP) Inter-Domain Traffic Engineering Label Switched Paths (TE-LSPs) of type Contiguous LSP. The network may be modified by those skilled in the art to use other MPLS related protocols rather that the exemplary protocol discussed herein.

The network 100 includes three IP/MPLS communication networks (CN) 105-1, 105-2 and 105-3, where each communication network 105 is associated with a respective area. The network 100 also includes at least one network management system (NMS) 120. As depicted, NMS 120 is operative to control a plurality of routers 110-1 through 110-11 distributed among the communication network areas 105-1 through 105-3.

First area 105-1 comprises the first 110-1, second 110-2 and fourth 110-4 routers, second area 105-2 comprises the third 110-3, fifth 110-5, sixth 110-6 and seventh 110-7 routers, while third area 105-3 comprises the eighth 110-8, ninth 110-9, tenth 110-10 and eleventh 110-11 routers. It is noted that various routers are interconnected to form thereby paths. Specifically, the following sequence of router connections is depicted in FIG. 1, where adjacent named routers are connected or linked to each other: R1-R2-R3-R6-R8-R10-R11-R9-R7-R5-R4-R1. In addition, R3 is connected/linked to each of R4, R5 and R7, while R7 is additionally connected/linked to R8.

The third 110-3 (R3) and fifth 110-5 (R5) routers operate as Area Border Routers (ABRs) separating the first 105-1 and second 105-2 areas. Similarly the eighth 110-8 (R8) and ninth 110-9 (R9) routers operate as ABRs separating the second 105-2 and third 105-3 areas.

Data packets or datagrams are routed according to ingress and egress virtual connection (VC) labels on a per-service basis. The VC labels are used by the PE routers 130 for demultiplexing traffic arriving from different services over the same set of LSP tunnels.

The NMS 120 is a network management system adapted for performing the various management functions described herein. The NMS 120 is adapted to communicate with nodes of CN 105. The NMS 120 may also be adapted to communicate with other operations support systems (e.g., Element Management Systems (EMSs), Topology Management Systems (TMSs), and the like, as well as various combinations thereof).

The NMS 120 may be implemented at a network node, network operations center (NOC) or any other location capable of communication with the CN 105 and various elements related thereto. The NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein. The NMS 120 may be implemented as a general purpose computing device or specific purpose computing device, such as described below with respect to FIG. 3.

The NMS 120 and the various routers 110 operate to support Resource Reservation Protocol (RSVP) Inter-Domain Traffic Engineering Label Switched Paths (TE-LSPs) of type Contiguous LSP.

As previously noted, each of the ABRs depicted in the network 105 of FIG. 1 (e.g., routers R3, R6, R8 and R9) receives an RSVP path message and performs a path computation (also referred to as an ERO expansion) before forwarding the RSVP Path message toward a next router downstream.

Various embodiments utilize a RSVP path message modified to include additional information adapted to communicate a preferred tie-breaking mechanism to be used by subsequent ABRs when selecting one of a plurality of equal cost multiple paths (ECMP) for a next hop. By ensuring that all of the ABRs use a preferred tie-breaking mechanism, service providers are able to establish end-to-end RSVP TE LSPs in a manner resulting in improved utilization of the network resources across multiple domains.

Within the context of the various embodiments, three tie-breaking mechanisms are discussed as being selectable as a preferred tie-breaking mechanism; namely, a least-fill mechanism (i.e., select the calculated path having the least-utilized links), a most-fill mechanism (i.e., select the calculated path having the most-utilized links), and a random mechanism (i.e., randomly select a calculated path). Those skilled in the art and informed by the teachings herein will appreciate that other tie-breaking mechanisms may also be used within the context of the various embodiments.

In various embodiments, indication of a preferred tie-breaking mechanism is provided via a new set of flag values in an Attribute Flags TLV, which is carried in an LSP_ATTRIBUTES Object such as defined in IETF RFC5420. For example, in one embodiment a first bit number (e.g., bit 1) of the Attribute Flags TLV may be denoted as a "least-fill" flag and used to indicate that the least-fill tie-breaking mechanism is preferred, while a second bit number (e.g., bit 2) of the Attribute Flags TLV may denoted as a "most-fill" flag and used to indicate that the most-fill tie-breaking mechanism is preferred. It will be appreciated that flag values or bits other than bits 1 and 2 of the Attribute Flags TLV may be used to indicate the preferred tie-breaking mechanism.

In one embodiment, if the "least-fill" bit is set to a first state (e.g., "1"), then the node responsible for path expansion must use the least-fill tie-breaking mechanism in the event of multiple equal cost paths. Similarly, if the "most-fill" bit is set to a first state (e.g., "1"), then the node responsible for path expansion must use the most-fill tie-breaking mechanism in the event of multiple equal cost paths. Finally, if neither bit is set to its first state (i.e., both bits cleared or set to a second state), then the node responsible for path expansion may use a default tie-breaking mechanism, random tie-breaking mechanism or other tie-breaking mechanism depending upon node configuration.

In this manner, service providers are able to establish end-to-end RSVP TE LSP where each ABR uses a preferred tie-breaking mechanism where multiple equal cost paths exist after an ERO expansion, thereby providing more consistent utilization of network resources across multiple domains.

Figure 2:
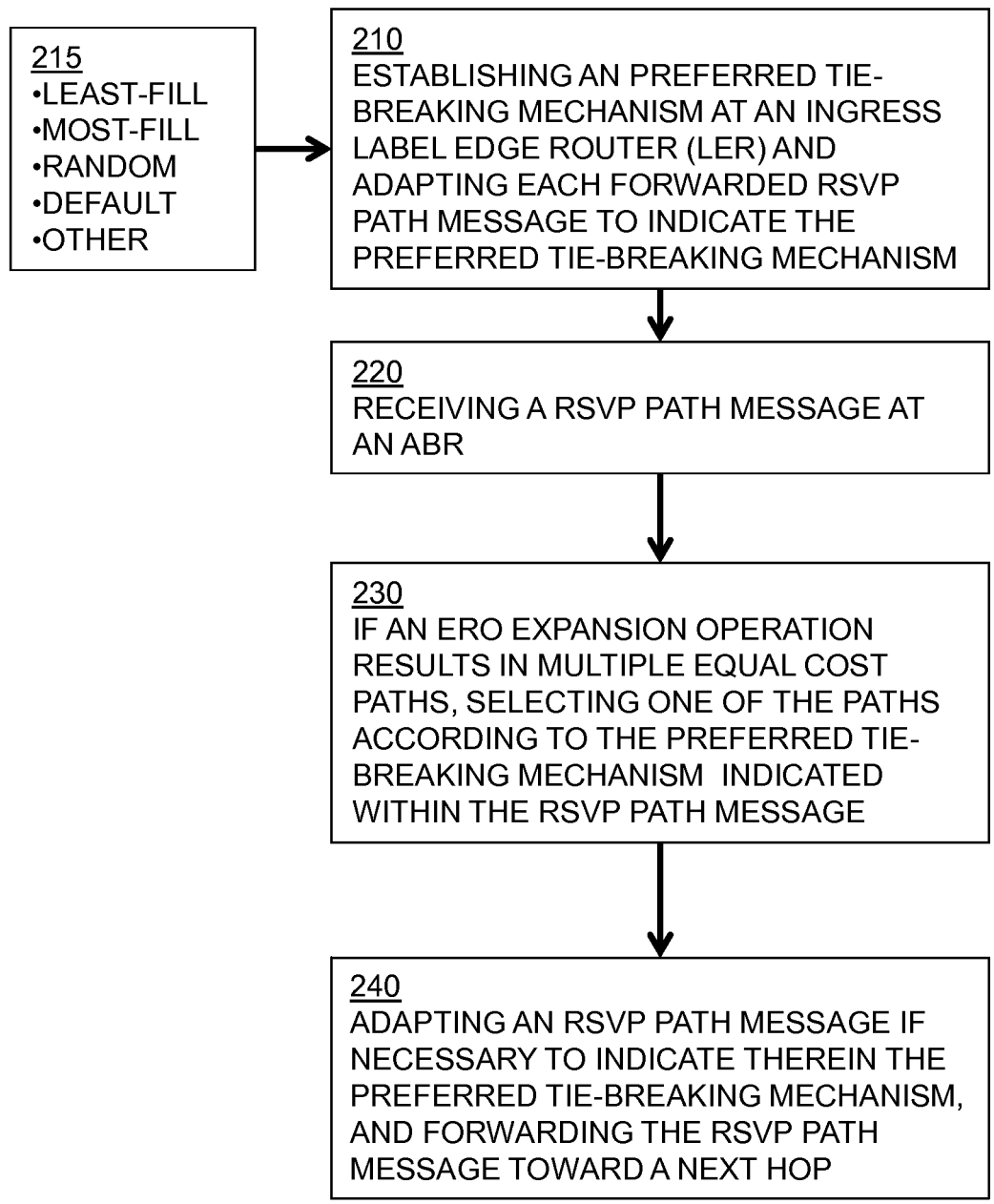
FIG. 2 depicts a flow diagram of a method according to one embodiment.

FIG. 2 depicts a flow diagram of a method according to one embodiment. Specifically, FIG. 2 depicts a method 200 for communicating a preferred tie-breaking mechanism to area border routers (ABRS) along an LSP.

At step 210, an LSP preferred tie-breaking mechanism is established at an Ingress Label Edge Router (LER). Referring to box 215, exemplary tie-breaking mechanisms include least-fill, most-fill, random, default as well as other tie-breaking mechanisms. The tie-breaking mechanism may be established automatically, by default, in response to customer service level agreement, in response to service provider requirements or in response to some other consideration.

In various embodiments, the tie-breaking mechanism is indicated by the setting or clearing of "least-fill" or "most-fill" flags/bits as described above. In various embodiments, the established tie-breaking mechanism is indicated by the use of different flags or bits. The established tie-breaking mechanism may be indicated using one or more bits within an existing LSP_ATTRIBUTES Object, one or more bits within a new LSP_ATTRIBUTES Object or some combination thereof.

At step 220, an ABR receives the RSVP path message and examines the appropriate portion of the RSVP path message to determine the established tie-breaking mechanism, next hop information and the like.

At step 230, if the next hop from the ABR comprises a loose hop (i.e., a hop to a router not directly connected to the ABR) then a lowest-cost path calculation or ERO expansion operation is performed. If the ERO expansion operation results in multiple equal cost paths, then the established tie-breaking mechanism is used to select one of the paths.

At step 240, an RSVP path message is adapted as necessary to indicate therein the established tie-breaking mechanism, and then forwarded toward a next hop.

Steps 220-240 are repeated for each ABR in the path.

As an example, and referring to FIG. 1, assume that a label switched path (LSP) is to be determined from R1 to R11. The path of an Inter-Domain TE LSP T1 from R1 (head-end LSR) to R11 (tail-end LSR) is defined on R1 as the following loosely routed path: R1-R3(loose)-R8(loose)-R11(loose). R3, R8, and R11 are defined as loose hops.

After establishing the LSP cost constraint mechanism, R1 determines that the next hop (R3) is a loose hop (not directly connected to R1) and then performs an ERO expansion operation to reach the next loose hops R3. The new ERO could become: R2(S)-R3(S)-R8(L)-R11(L) or R4(S)-R3(S)-R8(L)-R11(L), where S is a strict hop (L=0) and L is a loose hop (L=1). If both the paths R1-R2-R3 and R1-R4-R3 are equal-cost paths and satisfy T1's set of constraints, then the preferred tie-breaking mechanism as indicated in the RSVP path message is used to select one of the paths (e.g., least-fill, most-fill, random, default or other mechanism). Optionally, the selected cost constraint mechanism is communicated to the downstream nodes in RSVP Path Message.

The RSVP Path message is then forwarded by R1 following the path specified in the ERO object (selected using the preferred tie-breaking mechanism) and reaches R3 with the following content: R8(L)-R11(L).

R3 determines that the next hop (R8) is a loose hop (not directly connected to R3) and then performs an ERO expansion operation to reach the next loose hops R8. The new ERO could become: R6(S)-R8(S)-R11(L) or R7(S)-R8(S)-R11(L). If both the paths R6-R8-R11 and R7-R8-R11 are equal-cost paths and satisfy T1's set of constraints, then the preferred tie-breaking mechanism as indicated in the RSVP path message is used to select one of the paths.

The same procedure is repeated by R8 to reach T1's destination (R11) and which may also lead to two equal-cost paths R8-R10-R11 and R8-R9-R11. If both the paths R8-R10-R11 and R8-R9-R11 are equal-cost paths and satisfy T1's set of constraints, then the preferred tie-breaking mechanism as indicated in the RSVP path message is used to select one of the paths.

In the above example it is noted that by communicating the cost selection mechanism or procedure to be used end-to-end, every ABR (e.g., R3 and R8) uses the preferred tie-breaking mechanism as necessary such that the end-to-end Inter Domain TE-LSP uses the same tie-breaking mechanism throughout the different TE-Domains.

Figure 3:
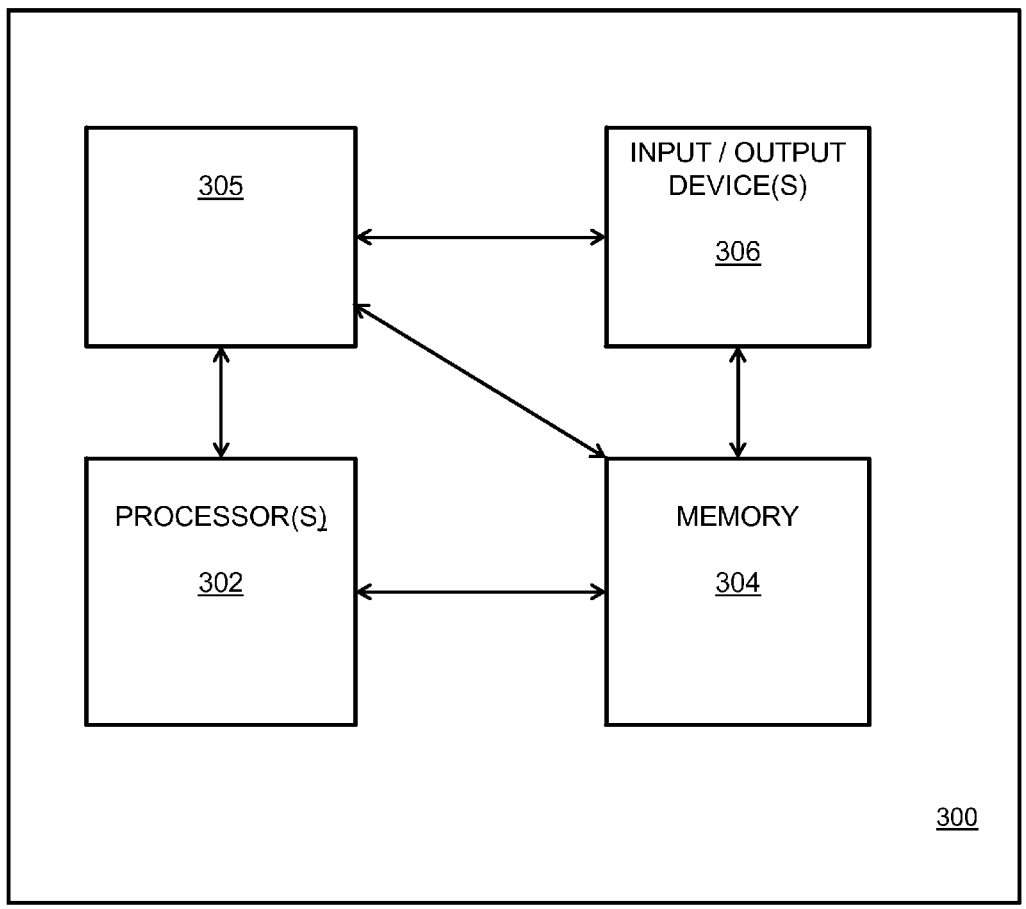
FIG. 3 depicts a high-level block diagram of a computing device suitable for use in performing functions described herein.

FIG. 3 depicts a high-level block diagram of a computing device, such as a processor in a telecom network element, suitable for use in performing functions described herein, such as the various network management functions, LSR functions, encapsulation functions, routing/path functions and so on associated with the various elements described above with respect to the figures.

As depicted in FIG. 3, computing device 300 includes a processor element 303 (e.g., a central processing unit (CPU) and/or other suitable processor(s)), a memory 304 (e.g., random access memory (RAM), read only memory (ROM), and the like), a cooperating module/process 305, and various input/output devices 306 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in software and/or in a combination of software and hardware, e.g., using a general purpose computer, one or more application specific integrated circuits (ASIC), and/or any other hardware equivalents. In one embodiment, the cooperating process 305 can be loaded into memory 304 and executed by processor 303 to implement the functions as discussed herein. Thus, cooperating process 305 (including associated data structures) can be stored on a computer readable storage medium, e.g., RAM memory, magnetic or optical drive or diskette, and the like.

It will be appreciated that computing device 300 depicted in FIG. 3 provides a general architecture and functionality suitable for implementing functional elements described herein or portions of the functional elements described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, transmitted via a tangible or intangible data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method, comprising:
    receiving a Resource Reservation Protocol (RSVP) path message including an indication of a preferred tie-breaking mechanism;
    based on a determination that an Explicit Route Object (ERO) expansion operation to determine a next Label Switched Path (LSP) hop results in identification of multiple equal cost paths satisfying a set of constraints for the LSP, selecting one of the multiple equal cost paths according to the preferred tie-breaking mechanism; and
    forwarding the RSVP path message including the indication of the preferred tie-breaking mechanism toward a next hop.

2. The method of claim 1, wherein the steps are performed by each Area Border Router (ABR) along a LSP.

3. The method of claim 2, wherein each ABR selects a tie-breaking mechanism for use by nodes in a successive Traffic Engineering (TE)-Domain.

4. The method of claim 3, wherein each ABR indicates a selected tie-breaking mechanism via a forwarded RSVP path message.

5. The method of claim 3, wherein the preferred tie-breaking mechanism comprises one of a least-fill tie-breaking mechanism, a most-fill tie-breaking mechanism, or a random tie-breaking mechanism.

6. The method of claim 1, wherein the preferred tie-breaking mechanism is established at an Ingress Label Edge Router (LER).

7. The method of claim 6, wherein the Ingress LER is adapted to establish the preferred tie-breaking mechanism in response to a control message received from a network management system (NMS).

8. The method of claim 1, wherein the indication of the preferred tie-breaking mechanism is provided via a LSP attribute encoded in Type-Length-Value (TLV) format.

9. The method of claim 8, wherein a state of a predefined bit of a LSP_ATTRIBUTES object is used to indicate the preferred tie-breaking mechanism.

10. The method of claim 8, wherein the LSP_ATTRIBUTES object comprises one or more bits associated with the preferred tie-breaking mechanism.

11. The method of claim 1, wherein the indication of the preferred tie-breaking mechanism is provided via flags within a LSP attribute Type-Length-Value (TLV).

12. The method of claim 11, wherein a first flag is set to a first state to indicate that the preferred tie-breaking mechanism is a first tie-breaking mechanism, a second flag is set to a first state to indicate that the preferred tie-breaking mechanism is a second tie-breaking mechanism, and the first and second flags are set to respective second states to indicate that the preferred tie-breaking mechanism is a third tie-breaking mechanism.

13. A telecom network element, comprising:
a processor and a memory communicatively connected to the processor, the processor configured to:
receive a Resource Reservation Protocol (RSVP) path message including an indication of a preferred tie-breaking mechanism;
based on a determination that an Explicit Route Object (ERO) expansion operation to determine a next Label Switched Path (LSP) hop results in identification of multiple equal cost paths satisfying a set of constraints for the LSP, select one of the multiple equal cost paths according to the preferred tie-breaking mechanism; and
forward the RSVP path message including the indication of the preferred tie-breaking mechanism toward a next hop.

14. The telecom network element of claim 13, wherein the indication of the preferred tie-breaking mechanism is provided via flags within a LSP attribute Type-Length-Value (TLV).

15. The telecom network element of claim 14, wherein a first flag is set to a first state to indicate that the preferred tie-breaking mechanism is a first tie-breaking mechanism, a second flag is set to a first state to indicate that the preferred tie-breaking mechanism is a second tie-breaking mechanism, and the first and second flags are set to respective second states to indicate that the preferred tie-breaking mechanism is a third tie-breaking mechanism.

16. A non-transitory computer-readable storage medium storing instructions which, when executed by a computer, adapt the operation of the computer to provide a method, the method comprising:
receiving a Resource Reservation Protocol (RSVP) path message including an indication of a preferred tie-breaking mechanism;
based on a determination that an Explicit Route Object (ERO) expansion operation to determine a next Label Switched Path (LSP) hop results in identification of multiple equal cost paths satisfying a set of constraints for the LSP, selecting one of the multiple equal cost paths according to the preferred tie-breaking mechanism; and
forwarding the RSVP path message including the indication of the preferred tie-breaking mechanism toward a next hop.

17. An apparatus, comprising:
a processor and a memory communicatively connected to the processor, the processor configured to:
receive a Resource Reservation Protocol (RSVP) path message including an indication of a preferred tie-breaking mechanism, wherein the preferred tie-breaking mechanism comprises one of a least-fill tie-breaking mechanism configured to select a calculated path having least-utilized links, a most-fill tie-breaking mechanism configured to select a calculated path having most-utilized links, or a random tie-breaking mechanism configured to randomly select a calculated path;
based on a determination that an Explicit Route Object (ERO) expansion operation to determine a next Label Switched Path (LSP) hop results in identification of multiple equal cost paths, select one of the multiple equal cost paths according to the preferred tie-breaking mechanism indicated in the RSVP path message; and
forward the RSVP path message including the indication of the preferred tie-breaking mechanism toward a next hop.

18. The apparatus of claim 17, wherein the indication of the preferred tie-breaking mechanism is provided via a LSP attribute encoded in Type-Length-Value (TLV) format.

19. The apparatus of claim 17, wherein the indication of the preferred tie-breaking mechanism is provided via flags within a LSP attribute Type-Length-Value (TLV).

20. The apparatus of claim 19, wherein a first flag is set to a first state to indicate that the preferred tie-breaking mechanism is a first tie-breaking mechanism, a second flag is set to a first state to indicate that the preferred tie-breaking mechanism is a second tie-breaking mechanism, and the first and second flags are set to respective second states to indicate that the preferred tie-breaking mechanism is a third tie-breaking mechanism.

* * * * *